Nov. 26, 1940.    J. K. BURNETTE    2,223,094
DISPENSER FOR CLEANSING TISSUES
Filed May 2, 1939
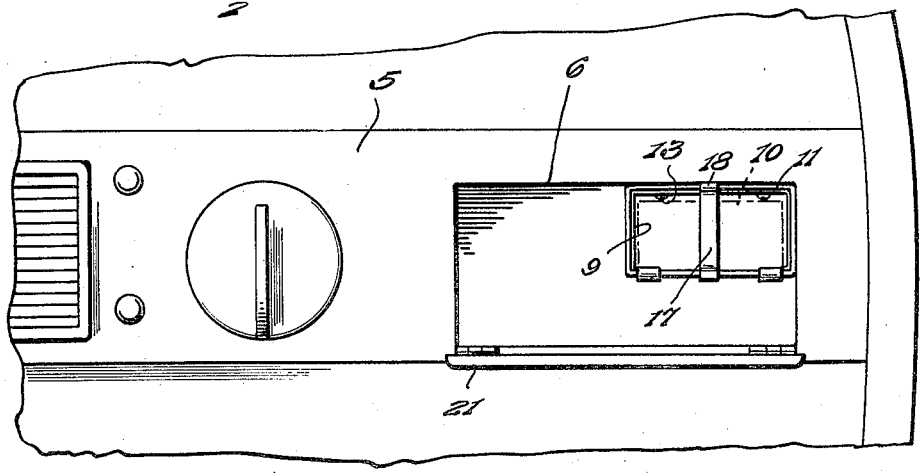
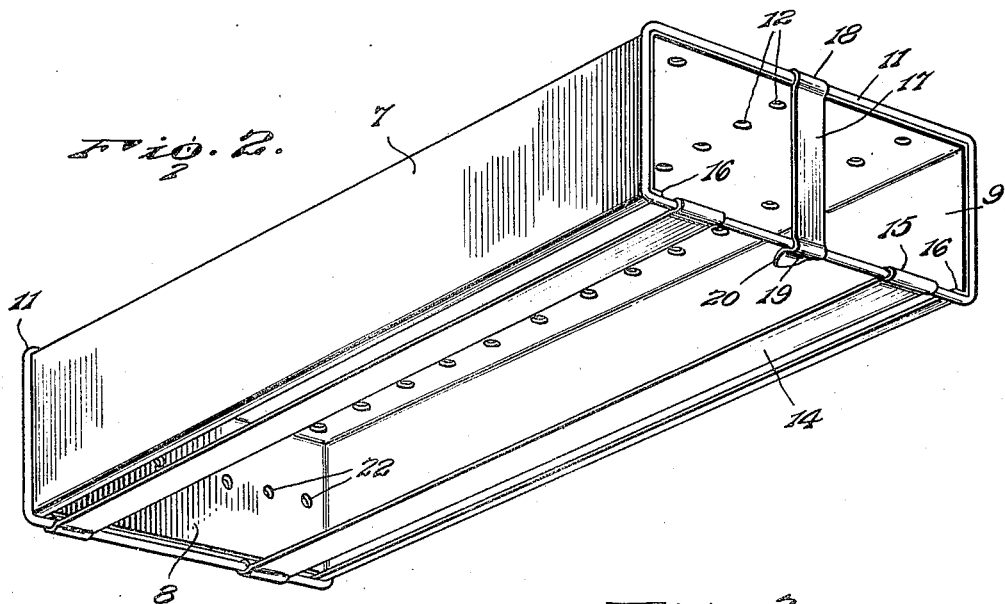
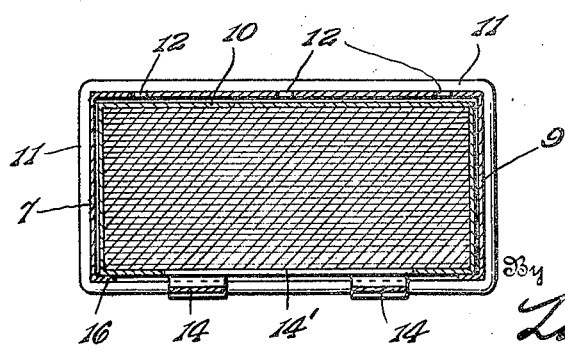
Inventor
John K. Burnette.
By Lacey & Lacey
Attorneys Patented Nov. 26, 1940

2,223,094

UNITED STATES PATENT OFFICE 2,223,094

DISPENSER FOR CLEANSING TISSUES

John K. Burnette, Jacksonville, Fla.

Application May 2, 1939, Serial No. 271,310

6 Claims. (Cl. 312—50)

This invention relates to dispensing devices and more particularly to a device for dispensing cleansing tissues.

The object of the invention is to provide a comparatively simple and inexpensive device of the character described adapted to be mounted within the glove compartment on the dashboard of an automobile or other vehicle and by means of which a supply of cleansing tissues may be housed within convenient reach of the driver of the automobile so as to permit ready detachment and removal of a selected strip of cleansing tissue when desired.

A further object of the invention is to provide a tissue dispenser including a casing having means for attachment to the wall of an automobile compartment and adapted to receive a box of cleansing tissue through one end thereof, means being provided for retaining the box within the casing and means for permitting the insertion of a filled box of tissue within said casing when the supply of tissue in the original box is exhausted.

A further object is to provide the bottom of the casing with coacting longitudinally disposed bars adjustable laterally with respect to each other according to the size of the dispensing opening in the box of cleansing tissue and thus support the tissue and prevent the removal of more than one strip at a time.

A still further object of the invention is generally to improve this class of devices so as to increase their utility, durability and efficiency.

In the accompanying drawing forming a part of this specification and in which similar numerals of reference indicate corresponding parts in all the figures of the drawing:

Figure 1 is a front elevation of a portion of the dash of an automobile showing the improved dispensing device positioned within the glove compartment, Figure 2 is a perspective view of the dispenser removed from the compartment, and Figure 3 is a transverse sectional view.

The dispensing device forming the subject-matter of the present invention is especially designed for supporting a box of cleansing tissue in an automobile within convenient reach of the driver, and in Figure 1 of the drawing is shown applied to an automobile of standard construction, in which 5 designates the dashboard and 6 the glove-receiving compartment. The device comprises a box-like casing 7 preferably formed of metal and having its rear end 8 closed and its front end 9 open to permit the insertion and removal of a standard box of cleansing tissue, indicated at 10. The front and rear portions of the casing 5 are preferably reinforced by wire frames 11 to impart the desired strength and rigidity to the casing, and the top of said casing is formed with a series of perforations 12 arranged in spaced longitudinal rows and extending for the entire length of the casing, as best shown in Figure 2 of the drawing. These openings or perforations 12 are adapted to receive screws or similar fastening devices 13 for the purpose of supporting the casing within the compartment 6 and against the upper wall thereof, as best shown in Figure 1 of the drawing. Disposed at the open bottom of the casing are coacting laterally adjustable bars 14, and these bars are adapted to extend across the dispensing opening 14' in the box of cleansing tissue and prevent accidental displacement of the cleansing tissue in the box. The bars 14 are preferably flat and the opposite ends thereof are formed with eyes 15 which slidably encircle the wires constituting the frames 11 so that said bars may be adjusted laterally to partially close the dispensing opening in the box of cleansing tissue. The side walls of the casing 7 are formed with inwardly extending flanges 16 on which the box of cleansing tissue rests and is supported, and extending transversely across the open end 9 of the casing is a latch or retaining member 17, one end of which is pivotally mounted at 18 on the adjacent frame 11 while the other end thereof is formed with a terminal spring catch 19 adapted to frictionally engage said frame so as to prevent removal of the box of tissue from the casing until the supply of tissue in the box is exhausted. By grasping the finger-piece 20 of the retaining member 17 and swinging said retaining member upwardly the empty box may be withdrawn through the open end of the casing and a new or filled box of cleansing tissue inserted therein and in which position it will be held against withdrawal by swinging the retaining member downwardly until the catch 19 engages the frame 11, as will be readily understood.

In order to remove a strip of cleansing tissue from the box, it is merely necessary to swing the door 21 of the glove compartment 6 downwardly when the casing 7 will be exposed and by reaching within the compartment and upwardly between the bars 14, a selected strip of tissue may be readily grasped by the fingers and detached from the box for use when desired. The door 21 is then swung upwardly to closed position to house and protect the supply of cleansing tissue and conceal the same so as not to present an unsightly appearance.

While it is preferred to mount the tissue dispenser within the glove compartment of an automobile, it will, of course, be understood that said dispenser may be mounted in any of the other compartments on the dash or at any other place on an automobile and supported in either a horizontal or a vertical position.

If desired, a row of openings 22 may be formed in the rear wall of the casing for the reception of a screw or screws to assist in retaining the casing within the compartment of the automobile.

It will also be understood that the dispensers may be made in different sizes and shapes and constructed of any suitable material without departing from the spirit of the invention.

Having thus described the invention, what is claimed as new is:

1. A device of the class described comprising a casing adapted to receive a box of cleansing tissue having a dispensing opening therein, reinforcing frames at the front and rear of the casing, and spaced longitudinal bars slidably mounted on and between said reinforcing frames at said dispensing opening and adjustable laterally with respect to each other.

2. A device of the class described comprising a casing having an open front and bottom and adapted to receive a box of cleansing tissue having a dispensing opening therein, reinforcing frames surrounding the casing at the front and rear ends thereof, and flat coacting members extending longitudinally of the open bottom of the casing and provided with terminal eyes extending around and slidably mounted for lateral movement on the reinforcing frames adjacent said dispensing opening.

3. A device of the class described comprising a casing having an open front and bottom and provided at said bottom with inwardly extending supporting flanges, reinforcing frames surrounding the casing at the front and rear thereof, said casing being adapted to receive a box of cleansing tissue having a dispensing opening therein with the box resting on said flanges, and longitudinally disposed bars slidably mounted on the reinforcing frames at the open bottom thereof and between said flanges, said bars being adjustable toward and away from each other.

4. A device of the class described comprising a casing including a top, back and side walls and an open bottom and front, said casing being adapted to receive a box of cleansing tissue having a dispensing opening therein, wire reinforcing frames surrounding the casing at the front and rear thereof, spaced longitudinal bars slidably mounted on the reinforcing frames and adjustable toward and away from each other adjacent the dispensing opening in said box, and a retaining member pivotally mounted on the upper portion of the front reinforcing frame and provided with a spring catch detachably engaging the lower portion of said frame for holding the box within the casing.

5. A device of the class described comprising a casing for attachment to a support and having an open bottom and an open front, reinforcing frames surrounding the casing at the front and rear thereof, said casing being adapted to removably receive a box of cleansing tissue having a dispensing opening therein, a retaining member pivotally mounted on the casing at the open front thereof for holding the box within the casing, and spaced longitudinal bars slidably mounted on the reinforcing frames at the open bottom thereof and movable toward and away from each other at the dispensing opening in said box.

6. A device of the class described comprising a casing having its top wall provided with a plurality of openings arranged in spaced rows longitudinally thereof and adapted to selectively receive a fastening device for securing the casing to a support, reinforcing frames at the front and rear of the casing, said casing having its front end and bottom open and adapted to removably receive a box of cleansing tissue having a dispensing opening therein, and coacting members slidably mounted on the reinforcing frames at the open bottom of the casing and adjustable transversely of the casing at the dispensing opening in said box.

JOHN K. BURNETTE.